United States Patent
Phan et al.

(10) Patent No.: US 6,667,958 B2
(45) Date of Patent: Dec. 23, 2003

(54) ROUTING CALLS TO EXTERNAL NETWORKS FROM A PRIVATE NETWORK

(75) Inventors: Cao Thanh Phan, Rueil Malmaison (FR); Nhut Quan Tran, Cergy (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/362,118

(22) Filed: Jul. 28, 1999

(65) Prior Publication Data

US 2003/0206526 A1 Nov. 6, 2003

(30) Foreign Application Priority Data

Aug. 6, 1998 (FR) .......................... 98 10132

(51) Int. Cl.$^7$ .............. H04L 1/00; H04L 12/26
(52) U.S. Cl. ............ 370/238; 370/351; 379/221.01; 379/221.02
(58) Field of Search ............... 370/238, 238.1, 370/351, 389, 392; 709/239, 241; 379/221.01, 221.02, 225, 229, 231, 232, 234, 112.01, 114.01, 114.02

(56) References Cited

U.S. PATENT DOCUMENTS

| | | | | |
|---|---|---|---|---|
| 5,274,643 | A | * 12/1993 | Fisk .......................... | 370/238 |
| 5,337,352 | A | * 8/1994 | Kobayashi et al. ......... | 379/234 |
| 5,754,543 | A | * 5/1998 | Seid ........................... | 370/351 |
| 6,104,701 | A | * 8/2000 | Avargues et al. ........... | 370/238 |
| 6,208,637 | B1 | * 3/2001 | Eames ........................ | 370/352 |
| 6,301,244 | B1 | * 10/2001 | Huang et al. ............... | 370/351 |
| 6,314,092 | B1 | * 11/2001 | Reeve ......................... | 370/351 |
| 6,324,280 | B2 | * 11/2001 | Dunn et al. ................ | 379/230 |
| 6,331,986 | B1 | * 12/2001 | Mitra et al. ................ | 370/468 |

FOREIGN PATENT DOCUMENTS

| DE | 196 14 926 A1 | 10/1997 |
|---|---|---|
| EP | 0 798 942 A2 | 10/1997 |
| GB | 2 300 089 A | 10/1996 |

OTHER PUBLICATIONS

N. Shaye: "Private Interconnect Networks Overview" GTE Automatic Electric World–Wide Communications Journal, vol. 20, No. 1, 1982, ages 2–12, XP002101198.

Werner, W.: "Wirtschaftlichkeit aks /oberstes Gebot" Telcom Report, vol. 19, No. 4, 1996, pp. 23–25, XP000629281.

Torrieri D.: "Algorithms for Finding an Optical Set of Short Disjoint Paths in a Communication Network" IEEE Transactions on Communications, vol. 40, No. 11, Nov. 1, 1992, pp. 1698–1702, XP000336308.

Chia–Jiu Wang et al.: "The Use of Artificial Neural Networks for Optimal Message Routing" IEEE Network: The Magazine of Computer Communications, vol. 9, No. 2, Mar. 1, 1995, pp. 16–24, XP000493486.

* cited by examiner

*Primary Examiner*—Wellington Chin
*Assistant Examiner*—Chirag Shah
(74) *Attorney, Agent, or Firm*—Sughrue Mion, PLLC

(57) ABSTRACT

In a method of routing calls to an external network from a calling node of a private network having a plurality of external network access circuit groups, each circuit group is connected to a gateway node of the private network. The method calculates a cost for different possible routes to the external network, the cost of a route to the external network being a function of the circuit group used and the route in the private network between the calling node and the gateway node of the circuit group used. It also chooses a route as a function of the calculated costs. The cost of a route to the external network is a decreasing function of the resources available on the circuit group used and is also a decreasing function of the load of the links used for routing in the private network. This optimizes use of the resources of the private network.

13 Claims, 1 Drawing Sheet

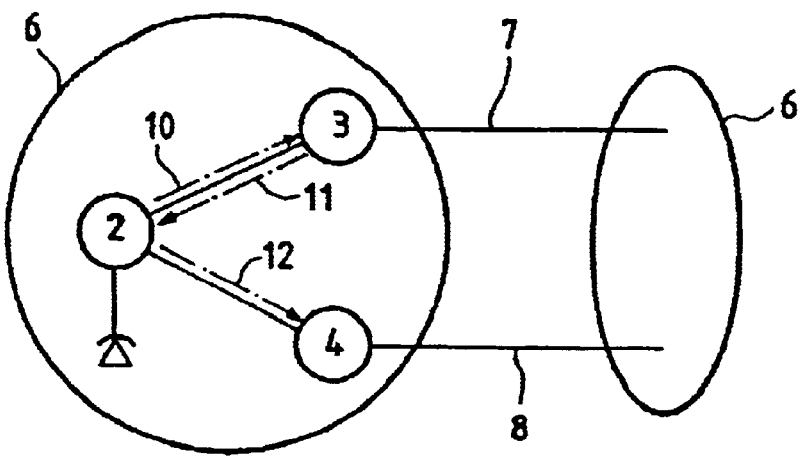
FIG_1 (PRIOR ART)
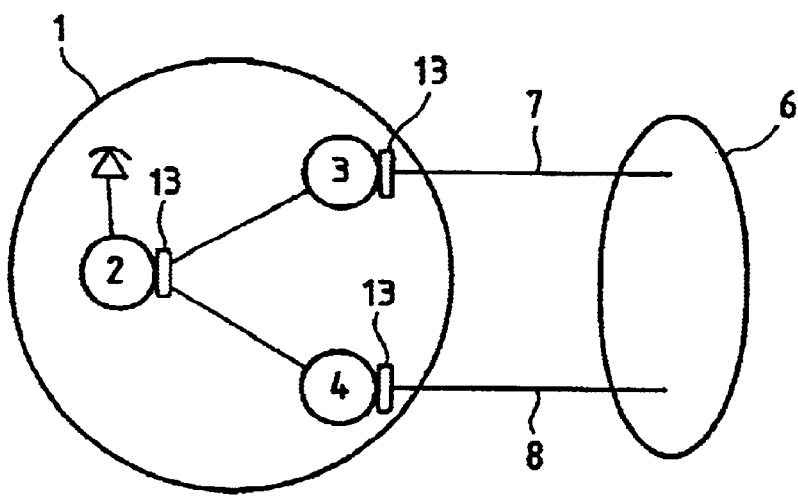
FIG_2
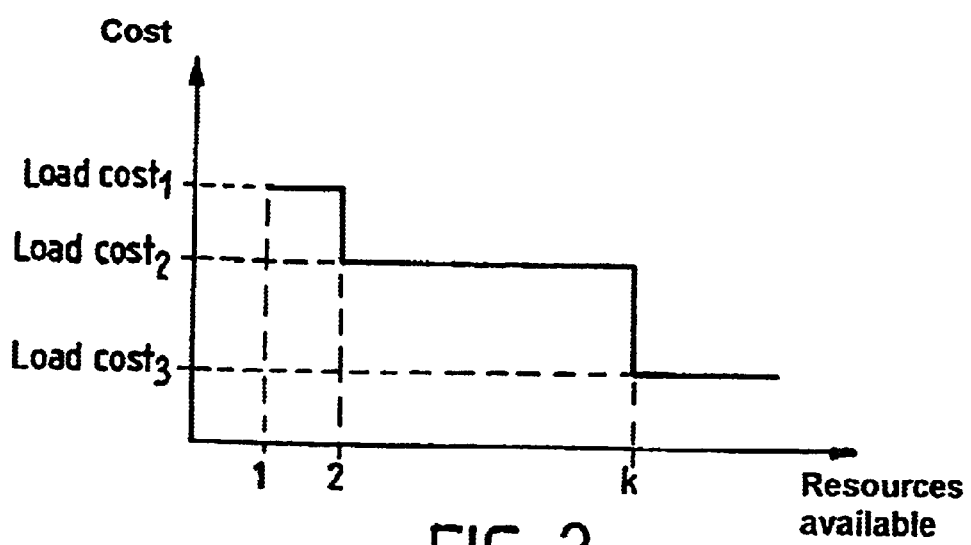
FIG_3

ROUTING CALLS TO EXTERNAL NETWORKS FROM A PRIVATE NETWORK

BACKGROUND OF THE INVENTION

1. Field of the Invention

The present invention is a method of routing calls to external networks from a calling node of a private network having a plurality of external network access circuit groups.

2. Description of the Prior Art

The invention concerns private telecommunication networks. These networks are formed of communication nodes interconnected by links carrying calls and/or signaling. In such networks, some nodes have circuit groups providing access to networks outside the private network, for example for a call to a party who is not on the private network or for overflow from the private network to an external network if the private network resources are congested.

In prior art private networks a circuit group providing access to an external network is seized by routing the call from the originating user to the node providing physical access to the circuit group, from which an outgoing call is made to the external network. The access node is a fixed parameter of the circuit group: for a user connected to a given node of the private network, a circuit group is also seized in the same way. The mechanism is the same in the event of overflow to the external network.

A node of the private network has a list of overflow circuit groups, which are used in succession in the event of problems. If access to the requested circuit group is congested or unavailable, the call is returned to the originating node from the node providing physical access to that circuit group; the originating node repeats the circuit group request using the next circuit group from the list. FIG. 1 shows one example of a network operating in accordance with this principle. FIG. 1 shows a private network 1 comprising three nodes 2, 3 and 4. The nodes 3 and 4 have access circuit groups 7 and 8 to an external network 6, which can be another private network or a public network. The node 2 contains a list of circuit groups (7, 8); a list of circuit groups providing access to node 2 and to circuit group 7 is supplied in response to a circuit group seizure request from a user at node 2. The request is transmitted to node 3, as shown symbolically in the figure by the arrow 10; if the resources are not available, the request is returned to the originating node (node 2—arrow 11 in the figure) and the second circuit group 8 from the list is selected, as shown by the arrow 12. If that circuit group is also congested or unavailable the request is again sent back to node 2.

This solution gives rise to serious traffic problems in the event of congestion of circuit groups. It increases the external circuit group call setup time. It does not manage the resources available in the network efficiently and cannot adapt demand to suit the load on the network.

The invention proposes a solution to the above problems, manages access to external networks and the resources of the private network more efficiently and limits the traffic across the private network generated by access to the circuit groups.

SUMMARY OF THE INVENTION

The invention is a method of routing calls to an external network from a calling node of a private network having a plurality of external network access circuit groups wherein each circuit group is connected to a gateway node of the private network, which method:

calculates a cost for different possible routes to the external network, the cost of a route to the external network being a function of the circuit group used and the route in the private network between the calling node and the gateway node of the circuit group used; and chooses a route as a function of the calculated costs.

In one embodiment of the invention the cost of a route to the external network is a decreasing function of the available resources of the circuit group used.

The cost of a route to the external network is preferably a decreasing function of the load of the links used for routing in the private network.

The cost of a route to the external network can also be a decreasing function of the number of links used for routing in the private network.

In another embodiment of the invention the step of choosing a route minimizes the cost of the route to the external network.

The method advantageously further comprises the exchange in the private network of maintenance messages between the various gateway nodes.

In this case, a maintenance message contains information on the available resources of a circuit group of a gateway node.

The step of calculating various possible routes to the external network preferably uses the Dijkstra algorithm.

Other features and advantages of the invention will become apparent on reading the following description of embodiments of the invention, which is given by way of example and with reference to the accompanying drawings.

BRIEF DESCRIPTION OF THE DRAWINGS

FIG. 1 is a diagrammatic representation of a prior art private network.

FIG. 2 is a diagrammatic representation of a private network in which the invention is used.

FIG. 3 shows one possible cost function in one embodiment of the invention.

DETAILED DESCRIPTION OF THE PREFERRED EMBODIMENT

The invention proposes, in a private network, to group together the local circuit groups to constitute logical circuit groups or distributed circuit groups. The grouping of local circuit groups into distributed circuit groups avoids static management of circuit group access from the point of view of the user or the node requiring access to an external network. The invention also proposes to associate with the circuit groups a cost representative of the circuit group load and the load in the network for access to the circuit groups. Taking this cost into account in choosing the circuit group optimizes the use of the resources of the network; additionally, the invention provides a new mode of management of resource congestion and limits user traffic on the network in the event of congestion; instead of this user traffic it uses traffic between the nodes, which has a smaller volume.

FIG. 2 shows one example of a private network in accordance with the invention. The network 1 shown in FIG. 2, like the network shown in FIG. 1, comprises three nodes 2, 3 and 4 and the nodes 3 and 4 have circuit groups 7 and 8 providing access to an external network 6. The invention proposes to represent the circuit groups 7 and 8 by a distributed circuit group which groups together the two circuit groups. The distributed circuit group comprises a plurality of local parts or local circuit groups—two of them in the case of FIG. 1, namely circuit groups 7 and 8—which contain the physical access and a global part 13 which is exported to the various nodes of the network to access the distributed circuit group.

In an embodiment of the above kind, access to the outside is effected by access to the distributed circuit group 13 without it being necessary for the calling node to specify which local circuit group 7 or 8 is used. On circuit group seizure, the calling node S sends a request specifying the external network R to which it requires access; a routing function that can be managed by the distributed circuit group sends back:

the local circuit group $F_i$ 7 or 8 chosen in the distributed network 13 for access to networks outside of the private network, and the node of the private network $P_i$ 3 or 4 to which the circuit group is connected (gateway node).

The gateway node can be replaced by a route providing access to it.

Within the distributed circuit group, the invention provides dynamic routing between the various local circuit groups of the distributed circuit group. This dynamic routing avoids the problems of the prior art by managing the various resources of the network and by preventing user traffic if resources are congested. Choosing between the various local circuit groups and routing to the chosen local circuit group can be effected in various ways. One routing process is described below, and allows for the loads on the local circuit groups and the traffic for access to the gateway node. In this embodiment, the local circuit group $F_i$ used is chosen to minimize a cost function, which is written as the sum of a cost $d_F(F_i)$ representative of the load of the local circuit group; and a cost $d_r(S, P_i)$ representative of the route across the private network to reach the gateway mode.

Using the above notation, access to a network R via the distributed circuit group minimizes:

$d_F(F_i)+d_r(Si, P_i)$ for the various circuit groups $F_i$ which provide access to the network R and for the various routes between the calling node S and the gateway node $P_i$ of the circuit group $F_i$.

FIG. 3 shows one example of the part of the cost function representative of the load of a local circuit group. The resources available on the circuit group are plotted on the horizontal axis, for example free channels or residual traffic capacity. A cost is plotted on the vertical axis. The figure essentially shows that the cost is a real decreasing function of a real variable which is the residual traffic capacity. The function is a step function in the figure, but only the values of the function for integer values of the residual capacity are important for the calculations, expressed for example in the form of a number of free channels. For an ISDN, in which the circuit group can comprise a plurality of T0 or T2 accesses, the number of free B channels is plotted on the horizontal axis. By definition, the cost represents an infinite value—i.e. a value higher than any other—if the circuit group is cut off, for example if a cable is disconnected. It has a "congested" value if no channel is available. It has a first value LoadCost1 if only one channel is available, a second value LoadCost2 if 2 to k channels are available, where k is an integer, and a value LoadCost3=1 if more than k channels are available, with LoadCost1>LoadCost2. A value of k in the order of 10 is appropriate; choosing a relatively low value of k avoids recalculation of the routes provided that the circuit groups remain only slightly congested. Other values are possible, in particular as a function of the capacity of the circuit groups and the number of channels occupied by a call. The choice of the values LoadCost3 and LoadCost2, like the choice of the values of the load for which the function changes values, depends on the nature of the network and on the required distribution of the load between the circuit groups.

The part of the cost function representative of the route across the private network can simply be calculated as a distance in the private network—for example, it can be representative of the number of links of the private network used to obtain access to the gateway node. Another cost function can also be used; thus a cost function could be used for each link of the type shown in FIG. 3, after which the cost of a route is calculated as the sum of the costs of the various links used by the route. The choice of the cost function depends on the nature of the constraints and for example can lead to optimization of the resources of the private network or to minimization of the length of the route.

The cost function can be the function described in our patent application filed the same day as this application with the title "Routing of calls with overflows in a private network". In that application, we seek to minimize a cost vector having a component representing a charge incurred because of the overflows and a private network link charge component. To define an order of such vectors, the present application proposes to consider first the component representing the charge incurred because of the overflows; for the same charge, the aim is to minimize the load of the links used. The load component is then a decreasing function of the resources available on a link.

The cost function can be calculated inside the private network using the Dijkstra algorithm. Using this algorithm to calculate a shorter path across a valued graph is known in itself. In accordance with the invention, the valuation of a link of the network depends on the chosen cost function; for minimizing the distance, each link of the private network is allocated the same value; a value can also be chosen for a link representative of its load, as explained above. In either case, or for another cost function, the Dijkstra algorithm is used to calculate a shorter path.

From the point of view of the private network administrator, the invention is simply implemented by specifying for each local circuit group whether it is part of a distributed circuit group or not.

In one embodiment of the invention, the various circuit groups of the distributed circuit group can exchange maintenance messages; these messages can contain:

information relating to changes of state of physical access points, for example the introduction into service of a coupler or the disconnection of a cable;

information relating to the change of cost, because of variations in the available resources.

These messages are used to update the available resources and for dynamic management of access to networks outside the private network. The maintenance messages generated by the various circuit groups generate less traffic on the private network than prior art solutions. For example, a broadcast message to update resources of a distributed circuit group can have a size in the order of 25 bytes; a call set-up message has a minimum size of 250 bytes.

What is more, the management of circuit groups in accordance with the invention assures that the call is routed directly to a physical circuit group which actually provides access to networks outside the private network. This avoids call setup duration problems that arise in prior art systems.

The various local parts grouped together in a distributed circuit group advantageously provide access to the some tariff area or, from the point of view of the private network, are equivalent in terms of cost of use. In the private network, this enables simple management of the distributed circuit group, through global management of access to the distributed circuit group, and without needing to manage the various possible costs within the distributed circuit group.

If the private network carries calls of different quality, for example voice calls and data calls, the routing function can be adapted to propose only local circuit groups which can complete the calls. In the FIG. 1 example, assuming that local circuit group 7 cannot carry data calls, although circuit group 8 can, the routing function of the distributed circuit group could return either of the local circuit groups for a request for outside access for a "voice" call; on the other hand, for a "data" call, the routing function would return only local circuit group 8. In this case the circuit group seizure request can specify not only the network to which access is required but also the quality of the call to be routed. Furthermore, the cost function used in this embodiment can take account of the residual capacity for the required call quality.

Of course, the present invention is not limited to the examples and embodiments described and shown and is open to many variants that will suggest themselves to the skilled person. It applies to private network types other than those described with reference to the examples, and in particular to private networks having a more complex topology than that shown in FIG. 2. It applies for access to more than one external network, for example the public switched network, at least one public land mobile network, at least one public satellite mobile network, etc. It applies to private networks independently of the number of different call qualities, which is not limited to the above example of two call qualities.

The invention is described with reference to FIG. 2 in the simple case of access to only one external network. It applies equally well when the private network has access to different external networks.

Finally, the description and the claims mention the Dijkstra algorithm. It is to be understood that this term covers not only the version of the shortest path algorithm proposed by Dijkstra, but also similar versions, and in particular the Bellman algorithm or the Floyd algorithm. Note that the Bellman algorithm applies only for graphs without circuits.

What is claimed is:

1. A method of routing calls to an external network from a calling node of a private network having a plurality of external network access circuit groups wherein each access circuit group is connected to a gateway node of said private network, the method comprising:

calculating a cost for different possible routes to said external network, the cost of a route to said external network being a function of a cost of the access circuit group and a cost of a route in said private network between said calling node and said gateway node of said access circuit group;

combining the calculated cost of the access circuit group with the cost of the route in said private network between said calling node and said gateway node; and selecting a route from said calling node to said external network as a function of the calculated combined costs, wherein the cost of the access circuit group includes the type of call to be routed.

2. The method claimed in claim 1 wherein the cost of a route to said external network is a decreasing function of the available resources of the circuit group used.

3. The method claimed in claim 1 wherein the cost of a route to said external network is a decreasing function of the load of the links used for routing in said private network.

4. The method claimed in claim 1 wherein the cost of a route to said external network is a decreasing function of the number of links used for routing in said private network.

5. The method claimed in claim 1 wherein said step of choosing a route minimizes the cost of the route to said external network.

6. A method as claimed in claim 1 further comprising the exchange in said private network of maintenance messages between the various gateway nodes.

7. The method claimed in claim 6 wherein a maintenance message contains information on the available resources of a circuit group of a gateway node.

8. The method claimed in claim 1 wherein said step of calculating various possible routes to said external network uses the Dijkstra algorithm.

9. The method as claimed in claim 6, wherein the maintenance message contains information relating to changes of state of physical access points, introduction of a coupler or disconnection of a cable.

10. The method claimed in claim 1, wherein the request can specify the type of call to be routed.

11. The method claimed in claim 10, wherein the type of call to be routed is classified as either a voice call or a data call.

12. The method claimed in claim 1, wherein said calculates a cost for different possible routes to said external network uses the Bellman algorithm or the Floyd algorithm.

13. The method claimed in claim 1, wherein the method applies for access to more than one external network.

* * * * *